United States Patent
Pedro et al.

(10) Patent No.: US 11,329,498 B2
(45) Date of Patent: May 10, 2022

(54) TECHNIQUES TO REGULATE CHARGING WITH AN ALTERNATOR AND A BATTERY TO MINIMIZE VEHICLE FUEL CONSUMPTION

(71) Applicants: David R Pedro, Windsor (CA); Arab Alsharif, Rochester Hills, MI (US); Joydip Saha, Troy, MI (US); Travis T Hamilton, Canton, MI (US); Nikhil Patil, Auburn Hills, MI (US); Geoffrey Giese, Ann Arbor, MI (US); Basil M Khaja, Waterford, MI (US); Ganapathy Machamada Somaiah, Royal Oak, MI (US); Joseph B Adams, Northville, MI (US); Paul Milligan, Whitmore Lane, MI (US)

(72) Inventors: David R Pedro, Windsor (CA); Arab Alsharif, Rochester Hills, MI (US); Joydip Saha, Troy, MI (US); Travis T Hamilton, Canton, MI (US); Nikhil Patil, Auburn Hills, MI (US); Geoffrey Giese, Ann Arbor, MI (US); Basil M Khaja, Waterford, MI (US); Ganapathy Machamada Somaiah, Royal Oak, MI (US); Joseph B Adams, Northville, MI (US); Paul Milligan, Whitmore Lane, MI (US)

(73) Assignee: FCA US LLC, Auburn Hills, MI (US)

( * ) Notice: Subject to any disclaimer, the term of this patent is extended or adjusted under 35 U.S.C. 154(b) by 102 days.

(21) Appl. No.: 16/989,026

(22) Filed: Aug. 10, 2020

(65) Prior Publication Data

US 2022/0045545 A1 Feb. 10, 2022

(51) Int. Cl.
*H02P 7/14* (2006.01)
*H02J 7/14* (2006.01)
(Continued)

(52) U.S. Cl.
CPC .......... *H02J 7/1446* (2013.01); *B60R 16/033* (2013.01); *H02P 9/48* (2013.01)

(58) Field of Classification Search
CPC ......... H02J 7/1446; B60R 16/033; H02P 9/48
See application file for complete search history.

(56) References Cited

U.S. PATENT DOCUMENTS 5,929,609 A 7/1999 Joy et al.
6,166,523 A 12/2000 Singh et al.
(Continued)

*Primary Examiner* — Sean Gugger
(74) *Attorney, Agent, or Firm* — Ralph E Smith

(57) ABSTRACT

Charging control techniques for a vehicle including an engine that drives an alternator configured to charge a battery of the vehicle comprise modeling a fuel consumption of the alternator for each load level across a range of alternator loads using an engine torque model and a set of operating parameters of the engine, determining an energy output from the alternator for each load level across the range of alternator loads, calculating a cost-to-charge metric based on the modeled alternator fuel consumption and the determined alternator energy output for each duty cycle across a range of duty cycles of the alternator, determining an optimal cost-to-charge from the calculated cost-to-charge metrics, determining a target cost-to-charge metric based on a state of charge of the battery, and operating the alternator accordingly at an optimal duty cycle based on the metrics and current engine operating conditions.

16 Claims, 3 Drawing Sheets

(51) Int. Cl.
*B60R 16/033* (2006.01)
*H02P 9/48* (2006.01)

(56) References Cited

U.S. PATENT DOCUMENTS

| | | |
|---|---|---|
| 8,401,779 B2 | 3/2013 | Troncoso et al. |
| 9,175,631 B2 | 11/2015 | Pan |
| 2008/0097664 A1* | 4/2008 | Aoyama ............... H02J 7/1423 701/36 |
| 2018/0083559 A1 | 3/2018 | Lee |
| 2018/0091076 A1* | 3/2018 | Koguchi ................ H02P 9/008 |

* cited by examiner

TECHNIQUES TO REGULATE CHARGING WITH AN ALTERNATOR AND A BATTERY TO MINIMIZE VEHICLE FUEL CONSUMPTION

FIELD

The present application generally relates to vehicle charging control systems and, more particularly, to techniques to regulate charging with an alternator and a battery to minimize vehicle fuel consumption.

BACKGROUND

An alternator is a device that is mechanically-driven by a crankshaft of an engine to generate electrical energy that is used to power vehicle accessory loads and/or to recharge a battery. The additional fuel that is consumed by the engine to drive the alternator can vary greatly depending on the operating zone of the engine. Similar to the engine, the alternator itself has operating regions of higher and lower efficiency. As a result, the vehicle could consume excessive fuel to generate electrical energy via the alternator when the engine is operating in inefficient operating zones. Conventional solutions to this situation include "smart charging" systems, such as regenerative braking or high load charging reduction. These conventional solutions, however, are not fully optimized (e.g., they may only operate during deceleration conditions). Accordingly, while these conventional systems do work for their intended purpose, there remains a need for improvement in the relevant art.

SUMMARY

According to one example aspect of the invention, a charging control system for a vehicle is presented. In one exemplary implementation, the system comprises: an alternator driven by an engine of the vehicle and configured to charge a battery of the vehicle and a controller configured to model a fuel consumption of the alternator for each load level across a range of alternator loads using an engine torque model and a set of operating parameters of the engine, determine an energy output from the alternator for each load level across the range of alternator loads, calculate a cost-to-charge metric based on the modeled alternator fuel consumption and the determined alternator energy output for each duty cycle across a range of duty cycles of the alternator, determine an optimal cost-to-charge from the calculated cost-to-charge metrics, determine a target cost-to-charge based on a state of charge of the battery, and operate the alternator at an optimal duty cycle corresponding to the optimal cost to charge, a target duty cycle corresponding to the target cost to charge, or zero duty cycle based on whether current engine operating conditions are indicative of a higher efficiency optimal cost zone for the engine or a lower efficiency target cost zone for the engine.

In some implementations, the controller is configured to calculate the cost-to-charge metric for each duty cycle of the alternator as a ratio of (i) the alternator fuel consumption to (ii) the alternator energy output. In some implementations, the optimal duty cycle corresponds to a minimum cost-to-charge metric across the range of alternator duty cycles.

In some implementations, when the engine operating conditions are indicative of the optimal operating zone, the controller is configured to (i) operate the alternator at the optimal duty cycle when the optimal cost-to-charge is less than the target cost-to-charge and operate the alternator at zero duty cycle when the optimal cost-to-charge is not less than the target cost-to-charge, and when the engine operating conditions are indicative of the target operating zone, the controller is configured to (i) operate the alternator at the target duty cycle when the one of the optimal cost-to-charge metrics is less than or equal to the target cost-to-charge and (ii) operate the alternator at zero duty cycle when none of the optimal cost-to-charge metrics is less than or equal to the target cost-to-charge.

In some implementations, the controller is further configured to calculate the target cost-to-charge metric using a calibrated function where the target cost-to-charge metric increases as the battery state of charge decreases. In some implementations, the controller is further configured to command a maximum duty cycle of the alternator during vehicle deceleration periods.

In some implementations, the set of operating parameters of the engine comprise air charge, engine speed, spark advance, fuel/air ratio, temperature, and accessory loads. In some implementations, the alternator energy output is determined using experimentally determined maps of alternator input torque and alternator efficiency.

According to another example aspect of the invention, a charging control method for a vehicle including an engine that drives an alternator configured to charge a battery of the vehicle is presented. In one exemplary implementation, the method comprises: modeling, by a controller of the vehicle, a fuel consumption of the alternator for each load level across a range of alternator loads using an engine torque model and a set of operating parameters of the engine. determining, by the controller, an energy output from the alternator for each load level across the range of alternator loads, calculating, by the controller, a cost-to-charge metric based on the modeled alternator fuel consumption and the determined alternator energy output for each duty cycle across a range of duty cycles of the alternator, determining, by the controller, an optimal cost-to-charge from the calculated cost-to-charge metrics, determining, by the controller, a target cost-to-charge metric based on a state of charge of the battery, and operating, by the controller, the alternator at an optimal duty cycle corresponding to the optimal cost to charge, a target duty cycle corresponding to the target cost to charge, or zero duty cycle based on whether current engine operating conditions are indicative of a higher efficiency optimal cost zone for the engine or a lower efficiency target cost zone for the engine.

In some implementations, the cost-to-charge metric is calculated for each duty cycle of the alternator as a ratio of (i) the alternator fuel consumption to (ii) the alternator energy output. In some implementations, the optimal duty cycle corresponds to a minimum cost-to-charge metric across the range of alternator duty cycles.

In some implementations, when the engine operating conditions are indicative of the optimal operating zone, the controller (i) operates the alternator at the optimal duty cycle when the optimal cost-to-charge is less than the target cost-to-charge and operates the alternator at zero duty cycle when the optimal cost-to-charge is not less than the target cost-to-charge, and when the engine operating conditions are indicative of the target operating zone, the controller (i) operates the alternator at the target duty cycle when the one of the optimal cost-to-charge metrics is less than or equal to the target cost-to-charge and (ii) operates the alternator at zero duty cycle when none of the optimal cost-to-charge metrics is less than or equal to the target cost-to-charge.

In some implementations, the method further comprises calculating, by the controller, the target cost-to-charge metric using a calibrated function where the target cost-to-charge metric increases as the battery state of charge decreases. In some implementations, the method further comprises commanding, by the controller, a maximum duty cycle of the alternator during vehicle deceleration periods.

In some implementations, the set of operating parameters of the engine comprise air charge, engine speed, spark advance, fuel/air ratio, temperature, and accessory loads. In some implementations, the alternator energy output is determined using experimentally determined maps of alternator input torque and alternator efficiency.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, both an engine and an alternator have varying efficiencies across their operating ranges. Conventional solutions to this situation include "smart charging" systems, such as regenerative braking or high load charging reduction, but these systems not fully optimized (e.g., they may only operate during deceleration conditions). Accordingly, improved charging control systems and methods are presented that regulate the alternator to generate and store energy in the battery when it is most efficient (based on both engine and alternator efficiency) to do so across all driving scenarios. These techniques determine a unique cost-to-charge metric across a range of duty cycles of the alternator. This cost-to-charge metric could be calculated, for example, as a ratio of the fuel consumption by the alternator to an energy output of the alternator. From the cost-to-charge metrics, an optimal (e.g., minimum) cost-to-charge and a corresponding optimal duty cycle are selected. As long as the optimal cost-to-charge is greater than a target cost-to-charge (e.g., based on a state of charge of the battery), the alternator operates at the optimal duty cycle. When the target cost-to-charge exceeds the optimal cost-to-charge (e.g., due to the battery state of charge falling), the alternator operates at a different or sub-optimal duty cycle. In addition, during vehicle deceleration periods, the alternator is operated at its maximum duty cycle to convert "free" vehicle kinetic energy.

Figure 1:
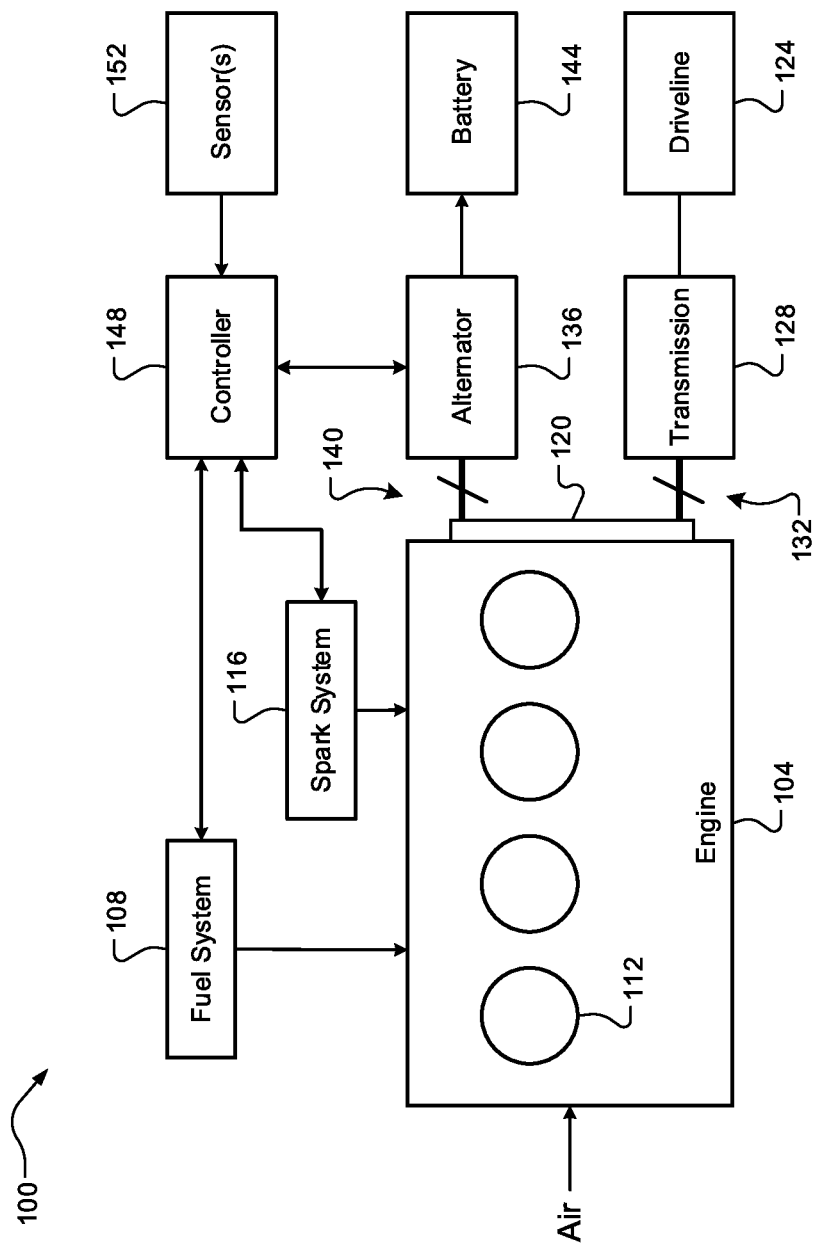
FIG. 1 is a functional block diagram of a vehicle having a charging control system according to the principles of the present disclosure.

Referring now to FIG. 1, a functional block diagram of a vehicle 100 having an example charging control system according to the principles of the present disclosure is illustrated. The vehicle 100 comprises an engine 104 that combines a mixture of air and fuel (e.g., gasoline) from a fuel system 108 within a plurality of cylinders 112. While four cylinders are shown, it will be appreciated that the engine 104 could include any suitable number of cylinders. The air/fuel mixture is compressed and combusted (e.g., via spark from spark system 116), which drives pistons (not shown) and generates drive torque at a crankshaft 120.

The drive torque is transferred to a driveline 124 of the vehicle 100 via a transmission 128 that is selectively coupled to the crankshaft 120 (e.g., via fluid coupling 132). The vehicle 100 also comprises an alternator 136 that is selectively coupled to the crankshaft 120 (e.g., via clutch 140). When driven by the crankshaft 120, the alternator 136 generates electrical energy that charges a battery 144 (e.g., a 12 V lead-acid or lithium-ion battery). A controller 148 controls operation of the engine 104 (e.g., air, fuel, and spark) to generate a desired amount of drive torque. The controller 148 operates based on inputs from a set of one or more sensors 152 that measure operating parameters of the vehicle 100. The controller 148 also controls the alternator 136 (e.g., its duty cycle) according to the techniques of the present disclosure, which will now be described in greater detail.

Figure 2:
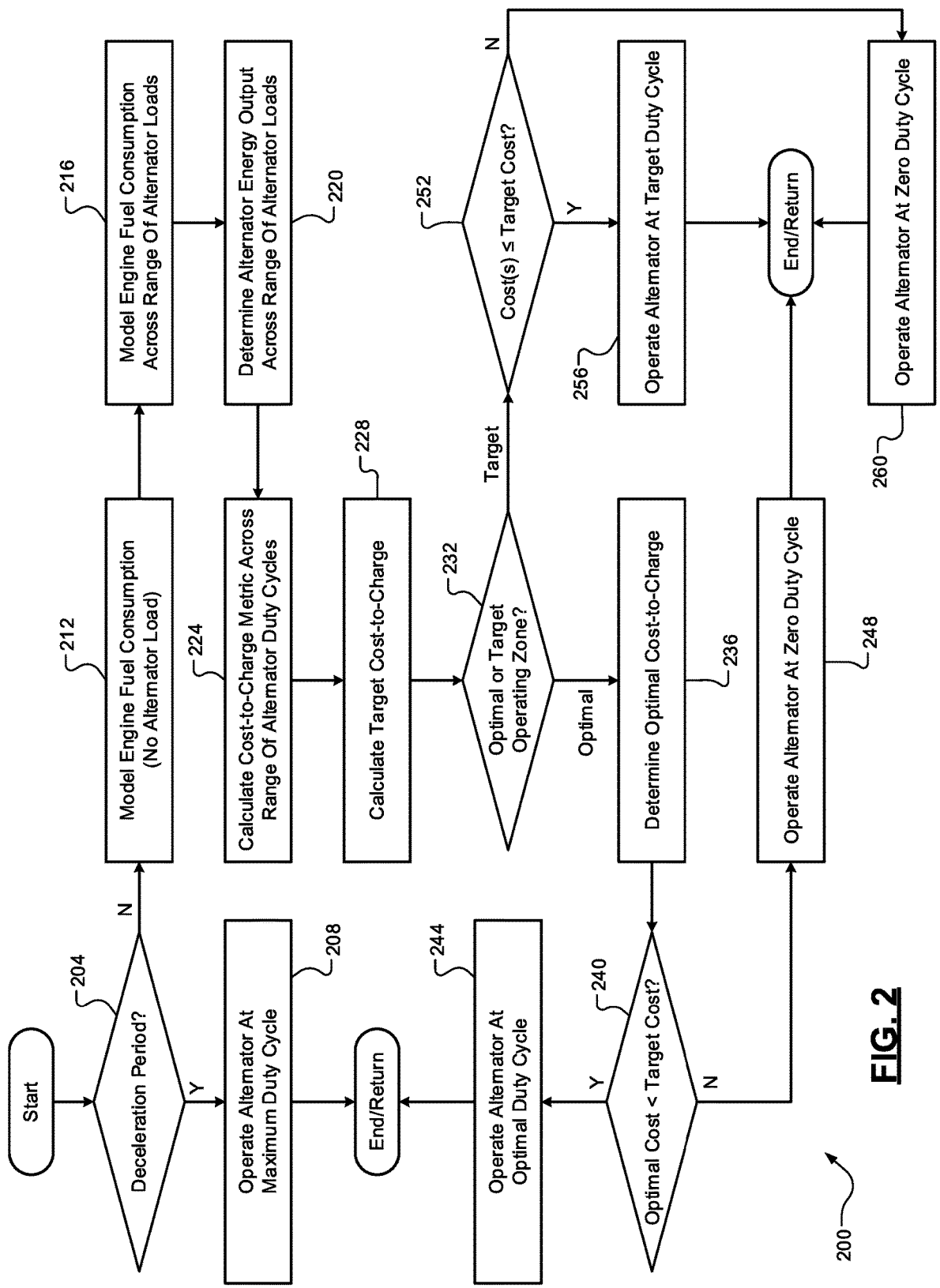
FIG. 2 is a flow diagram of an example vehicle charging control method according to the principles of the present disclosure.

Referring now to FIG. 2 and with continued reference to the vehicle 100 of FIG. 1, a flow diagram of a charging control method 200 according to the principles of the present disclosure is illustrated. At 204, the controller 148 determines whether a vehicle deceleration period is occurring (e.g., the driver has his/her foot off of the accelerator pedal and the vehicle 100 is coasting). When true, the method 200 proceeds to 208 where the controller 148 operates the alternator 136 at its maximum duty cycle (e.g. 100%). By doing this, the alternator 136 is able to convert as much "free" vehicle kinetic energy as possible. The method 200 then ends or returns (e.g., to 204). When the vehicle deceleration period is not occurring, the method 200 proceeds to 212.

At 212, the controller 148 models a fuel consumption of the engine 104 using an engine torque model and a set of operating parameters of the engine 104. For example, the engine torque model can model engine flywheel torque in real-time, and then fuel consumption can be derived therefrom. The operating parameters of the engine 104 could include, for example only, air charge, engine speed, spark advance, fuel/air ratio (lambda), temperature, and accessory loads. Some of these parameters could be measured (engine speed, lambda, temperature, etc.) by sensors 152 while other parameters could be modeled. At 216, the controller 148 models the fuel consumption of the engine 104 using the engine torque model and the set of operating parameters and for each load level across a range of alternator loads. A difference between the fuel consumption of the engine 104 with a given alternator load and the fuel consumption of the engine 104 with no alternator load thus represents the alternator fuel consumption for the given alternator load.

At 220, the controller 148 determines an energy output from the alternator 136 for each load level across the range of alternator loads. In one exemplary implementation, this involves using experimentally predetermined maps of alternator input torque and alternator efficiency. For example only, the alternator energy output could be a product of (i) alternator input torque, (ii) alternator speed, and (iii) alternator efficiency. While 212-220 are shown in a sequential order, it will be appreciated that these calculations could also all be occurring simultaneously or at least partially overlapping.

At 224, the controller 148 calculates a unique cost-to-charge metric based on the alternator fuel consumption (e.g., grams, or g) and the alternator energy output (e.g., kilowatt hours, or KWh) for each duty cycle (e.g., percentage, or %) across a range of duty cycles of the alternator 136. In one exemplary implementation, this calculation is a ratio of (i) the alternator fuel consumption at a particular load to (ii) the alternator energy output at a particular load. This cost-to-charge metric is unique in that it incorporates both the efficiency of the engine 104 to produce torque to compensate for the alternator load and the efficiency of the alternator 136 itself to produce electrical energy. The cost-to-charge metric is calculated across the entire range of alternator duty cycles (e.g., 0% to 100%) at each time step to create a curve, such as the example curve shown in FIG. 3. The optimal cost-to-charge can vary significantly throughout the speed-load range of the engine and thus this strategy will take advantage of the most efficient regions, also referred herein as an optimal operating zone (as opposed to a different, less efficient target operating zone). These zones could be defined by current operating conditions of the engine 104 (e.g., an engine speed/load map).

Figure 4:
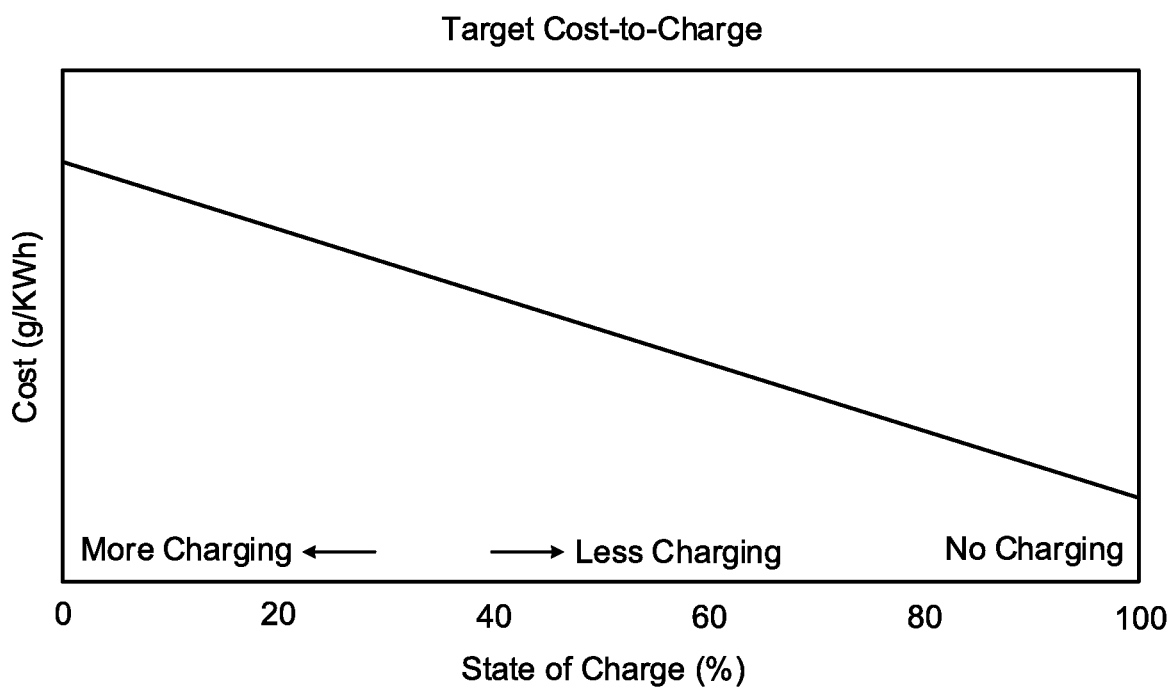
FIG. 4 is a plot of an example target cost-to-charge curve across an entire range of battery states of charge according to the principles of the present disclosure.

At 228, the controller 148 determines a target cost-to-charge metric based on a state of charge of the battery 140. The state of charge of the battery 140 could be measured (e.g., by sensors 152) or modeled or determined from some combination thereof. As shown in FIG. 4, a calibrated or predetermined target cost-to-charge table or curve could be utilized, where the target cost-to-charge increases as the battery state of charge decreases. At 232, the controller 148 determines whether current engine operating conditions are indicative of the optimal operating zone or the target operating zone. When the operating conditions are indicative of the optimal operating zone, the method 200 proceeds to 236. Otherwise, the method 200 proceeds to 252.

Figure 3:
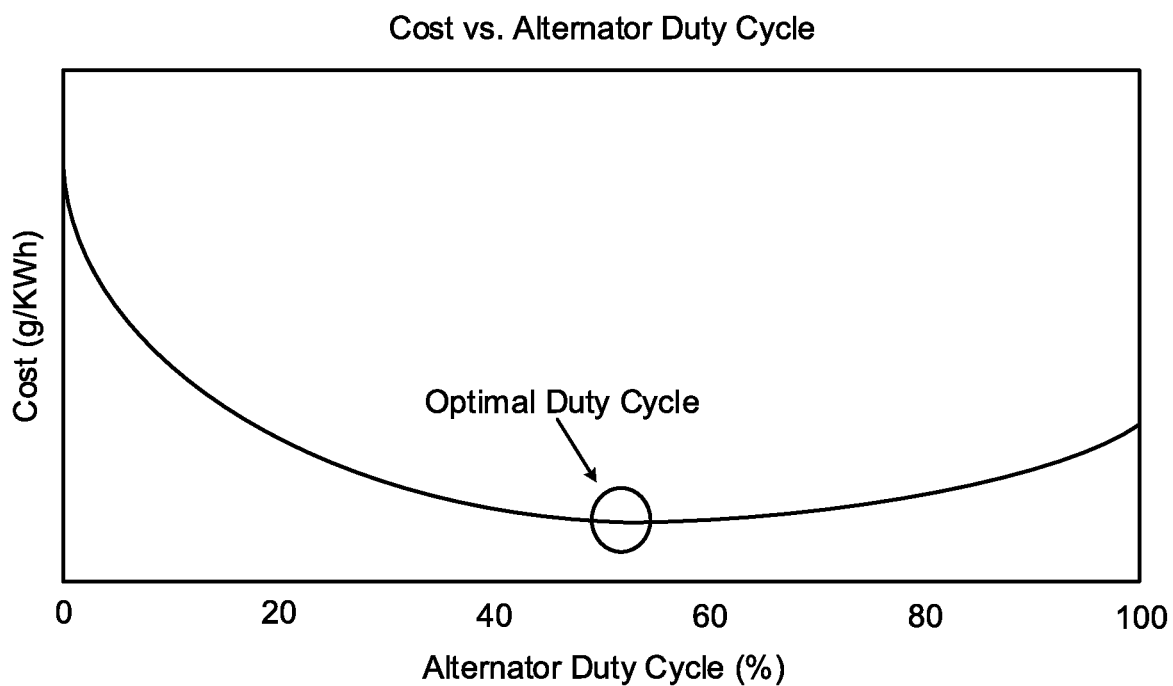
FIG. 3 is a plot of an example cost-to-charge metric curve across an entire range of alternator duty cycles according to the principles of the present disclosure.

At 236, the controller 148 determines determine an optimal cost-to-charge from the calculated cost-to-charge metrics. As shown in FIG. 3, this could be the alternator duty cycle corresponding to the minimum cost-to-charge metric along the curve. At 240, the controller 148 determines whether the optimal cost-to-charge is less than the target cost-to-charge. When true, the method 200 proceeds to 244 where the controller 148 operates the alternator 136 at an optimal duty cycle corresponding to the optimal cost-to-charge and then method 200 then ends or returns. When the optimal cost-to-charge is greater than or equal to the optimal cost-to-charge, however, the method 200 proceeds to 248 where the controller 148 operates the alternator 136 at zero duty cycle (i.e., no charging occurring, or commanding a zero voltage setpoint). The method 200 then ends or returns.

At 252, the controller 148 determines whether any of the calculated cost-to-charge metrics is less than or equal to the target cost-to-charge. When true, the method 200 proceeds to 256 where the controller 148 operates the alternator 136 at a target duty cycle corresponding to the target cost-to-charge and the method 200 then ends or returns. When none of the calculated cost-to-charge metrics is less than or equal to the target cost-to-charge metric, the method 200 proceeds to 260 where the controller 148 operates the alternator 136 at zero duty cycle (i.e., no charging occurring, or commanding a zero voltage setpoint). The method 200 then ends or returns.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A charging control system for a vehicle, the system comprising:
    an alternator driven by an engine of the vehicle and configured to charge a battery of the vehicle; and
    a controller configured to:
        model a fuel consumption of the alternator for each load level across a range of alternator loads using an engine torque model and a set of operating parameters of the engine;
        determine an energy output from the alternator for each load level across the range of alternator loads;
        calculate a cost-to-charge metric based on the modeled alternator fuel consumption and the determined alternator energy output for each duty cycle across a range of duty cycles of the alternator;
        determine an optimal cost-to-charge from the calculated cost-to-charge metrics;
        determine a target cost-to-charge based on a state of charge of the battery; and
        operate the alternator at an optimal duty cycle corresponding to the optimal cost to charge, a target duty cycle corresponding to the target cost to charge, or zero duty cycle based on whether current engine operating conditions are indicative of a higher efficiency optimal cost zone for the engine or a lower efficiency target cost zone for the engine.

2. The system of claim 1, wherein the controller is configured to calculate the cost-to-charge metric for each duty cycle of the alternator as a ratio of (i) the alternator fuel consumption to (ii) the alternator energy output.

3. The system of claim 1, wherein the optimal duty cycle corresponds to a minimum cost-to-charge metric across the range of alternator duty cycles.

4. The system of claim 1, wherein:
    when the engine operating conditions are indicative of the optimal operating zone, the controller is configured to (i) operate the alternator at the optimal duty cycle when the optimal cost-to-charge is less than the target cost-to-charge and operate the alternator at zero duty cycle when the optimal cost-to-charge is not less than the target cost-to-charge; and
    when the engine operating conditions are indicative of the target operating zone, the controller is configured to (i) operate the alternator at the target duty cycle when the one of the optimal cost-to-charge metrics is less than or equal to the target cost-to-charge and (ii) operate the alternator at zero duty cycle when none of the optimal cost-to-charge metrics is less than or equal to the target cost-to-charge.

5. The system of claim 1, wherein the controller is further configured to calculate the target cost-to-charge metric using a calibrated function where the target cost-to-charge metric increases as the battery state of charge decreases.

6. The system of claim 1, wherein the controller is further configured to command a maximum duty cycle of the alternator during vehicle deceleration periods.

7. The system of claim 1, wherein the set of operating parameters of the engine comprise air charge, engine speed, spark advance, fuel/air ratio, temperature, and accessory loads.

8. The system of claim 1, wherein the alternator energy output is determined using experimentally determined maps of alternator input torque and alternator efficiency.

9. A charging control method for a vehicle including an engine that drives an alternator configured to charge a battery of the vehicle, the method comprising:
modeling, by a controller of the vehicle, a fuel consumption of the alternator for each load level across a range of alternator loads using an engine torque model and a set of operating parameters of the engine;
determining, by the controller, an energy output from the alternator for each load level across the range of alternator loads;
calculating, by the controller, a cost-to-charge metric based on the modeled alternator fuel consumption and the determined alternator energy output for each duty cycle across a range of duty cycles of the alternator;
determining, by the controller, an optimal cost-to-charge from the calculated cost-to-charge metrics;
determining, by the controller, a target cost-to-charge metric based on a state of charge of the battery; and
operating, by the controller, the alternator at an optimal duty cycle corresponding to the optimal cost to charge, a target duty cycle corresponding to the target cost to charge, or zero duty cycle based on whether current engine operating conditions are indicative of a higher efficiency optimal cost zone for the engine or a lower efficiency target cost zone for the engine.

10. The method of claim 9, wherein the cost-to-charge metric is calculated for each duty cycle of the alternator as a ratio of (i) the alternator fuel consumption to (ii) the alternator energy output.

11. The method of claim 9, wherein the optimal duty cycle corresponds to a minimum cost-to-charge metric across the range of alternator duty cycles.

12. The method of claim 9, wherein:
when the engine operating conditions are indicative of the optimal operating zone, the controller (i) operates the alternator at the optimal duty cycle when the optimal cost-to-charge is less than the target cost-to-charge and operates the alternator at zero duty cycle when the optimal cost-to-charge is not less than the target cost-to-charge; and
when the engine operating conditions are indicative of the target operating zone, the controller (i) operates the alternator at the target duty cycle when the one of the optimal cost-to-charge metrics is less than or equal to the target cost-to-charge and (ii) operates the alternator at zero duty cycle when none of the optimal cost-to-charge metrics is less than or equal to the target cost-to-charge.

13. The method of claim 9, further comprising calculating, by the controller, the target cost-to-charge metric using a calibrated function where the target cost-to-charge metric increases as the battery state of charge decreases.

14. The method of claim 9, further comprising commanding, by the controller, a maximum duty cycle of the alternator during vehicle deceleration periods.

15. The method of claim 9, wherein the set of operating parameters of the engine comprise air charge, engine speed, spark advance, fuel/air ratio, temperature, and accessory loads.

16. The method of claim 9, wherein the alternator energy output is determined using experimentally determined maps of alternator input torque and alternator efficiency.

* * * * *